(12) United States Patent
Bruns

(10) Patent No.: US 6,397,360 B1
(45) Date of Patent: May 28, 2002

(54) METHOD AND APPARATUS FOR GENERATING A FIBRE CHANNEL COMPLIANT FRAME

(75) Inventor: Scott R. Bruns, Round Rock, TX (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/363,130

(22) Filed: Jul. 28, 1999

(51) Int. Cl.[7] ............................................... G01R 31/28
(52) U.S. Cl. ....................................... 714/715; 714/821
(58) Field of Search .............................. 455/9; 714/712, 714/799, 715, 821, 713, 820; 710/20, 30; 370/249; 375/221; 359/110

(56) References Cited

U.S. PATENT DOCUMENTS

| | | | | | |
|---|---|---|---|---|---|
| 4,449,247 A | * | 5/1984 | Waschka, Jr. | ................... | 455/9 |
| 4,967,412 A | * | 10/1990 | Cain et al. | ................... | 714/712 |
| 5,251,204 A | * | 10/1993 | Izawa et al. | ................. | 370/249 |
| 6,069,876 A | * | 5/2000 | Lander et al. | ............... | 370/249 |
| 6,185,631 B1 | * | 2/2001 | Casper et al. | .................. | 710/20 |
| 6,201,829 B1 | * | 3/2001 | Schneider | .................... | 375/221 |
| 6,233,073 B1 | * | 5/2001 | Bowers et al. | ............... | 359/110 |
| 6,298,398 B1 | * | 10/2001 | Elliott et al. | ................... | 710/30 |

\* cited by examiner

Primary Examiner—David Ton
(74) Attorney, Agent, or Firm—Carstens, Yee & Cahoun LLP

(57) ABSTRACT

A method and apparatus for generating a Fiber Channel compliant frame when a user enters a simple test pattern. A system is provided in which a user can enter an unencoded user test pattern for a Fiber Channel link which is being tested. The system then can then determine and combine additional information that will format the user's unencoded test pattern into a Fiber Channel compliant frame. The user can then visualize on a display the established Fiber Channel compliant frame and decide whether to modify the Fiber Channel compliant frame before outputting it to the link under test. A comparison can be performed between the data stream that is received after a transmission to the Fiber Channel link to determine whether the Fiber Channel link is in compliance with an established standard.

36 Claims, 2 Drawing Sheets

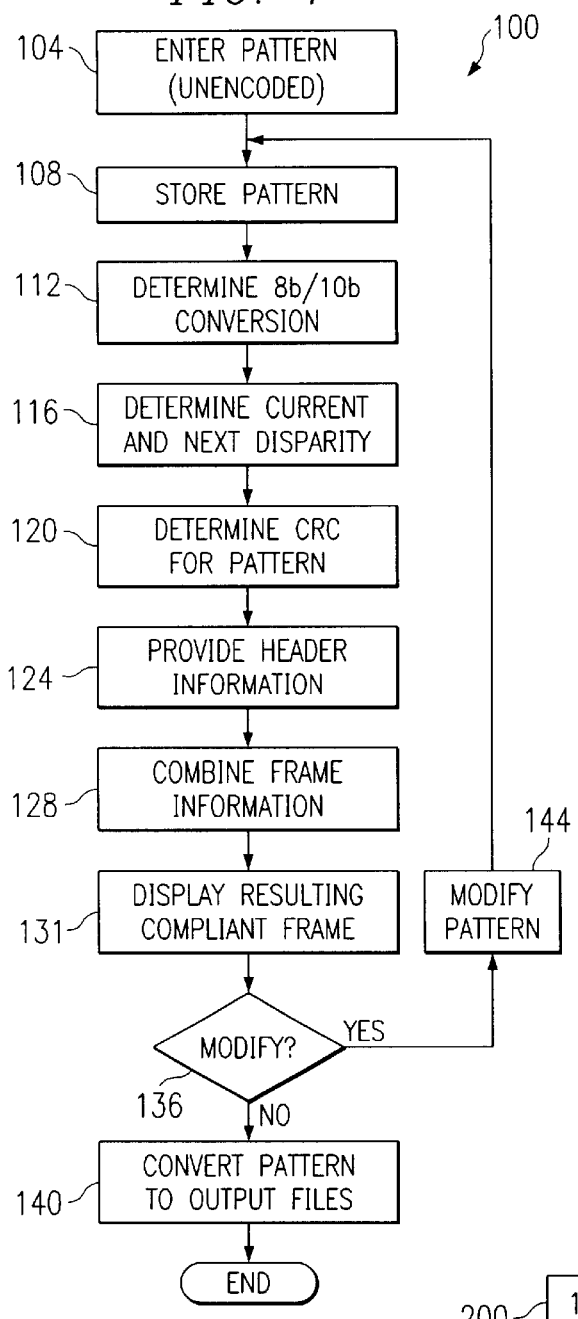
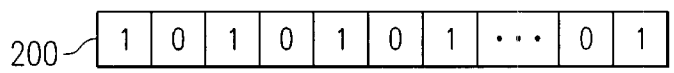
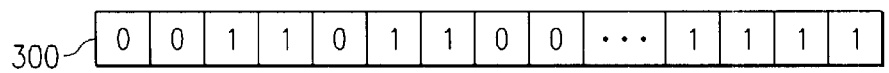

METHOD AND APPARATUS FOR GENERATING A FIBRE CHANNEL COMPLIANT FRAME

BACKGROUND

In computer systems, a variety of technologies can be utilized to connect components of a computer system. One such technology is known as Fibre Channel. Fibre Channel employs a network of links established between components. As Fibre Channel links are created, it is necessary to test these links between the various devices on the Fibre Channel system to make sure that the links are compliant with applicable standards. These standards might be industry standards or particular standards established by a customer for the customer's computer system.

In the past, installers of Fibre Channel have been forced to generate a frame of Fibre Channel compliant data by hand. This has involved generating data that meets the specifications of a Fibre Channel data structure. As a result, the testing process has required a great deal of time since the need to generate the test pattern has required much physical labor. Furthermore, it is difficult to know whether a certain pattern of data that is entered by a test technician will result in a data string that taxes the Fibre Channel link to its performance threshold. This is because the encoding of the data pattern and addition of formatting data can alter the characteristics of the data string. Therefore, it is presently a difficult process for a technician to thoroughly test a Fibre Channel link in an efficient manner. In addition, it is very difficult for such a technician to derive a data string that pushes a Fibre Channel link to its ultimate performance threshold.

For example, a Fibre Channel compliant frame typically encompasses a serial data string of binary signals, such as voltage signals between 0.6 and 1.6 volts. The transition between the 0.6 and 1.6 volt signals can be a factor for determining whether a Fibre Channel link complies with a compliance standard. Therefore, there is a need for an apparatus and method that allow a user to visualize the transition in a Fibre Channel compliant frame and to determine whether such a transition sequence will be a useful test pattern for the Fibre Channel link.

SUMMARY

The present invention satisfies the existing needs and provides solutions to existing problems. One advantage of one embodiment of the present invention is that it allows a user to enter a test pattern for a Fibre Channel link and see the resulting Fibre Channel compliant frame that is generated from the test pattern.

A further advantage of another embodiment of the invention is that it allows a user to generate a Fibre Channel compliant frame through the use of a computer.

Another embodiment of the invention is advantageous in that it permits a user to modify a previously entered test pattern.

One embodiment of the invention allows a user to enter an unencoded pattern and format the unencoded pattern into a Fibre Channel compliant frame. The unencoded pattern is converted to a coded pattern and combined with additional data necessary to create the Fibre Channel compliant frame. This is accomplished through the use of a computer.

Another embodiment of the invention allows a user to visualize the initial Fibre Channel compliant frame and modify that Fibre Channel compliant frame so as to create a different Fibre Channel compliant frame. This is accomplished in one case by modifying the unencoded pattern input by the user. The resulting Fibre Channel compliant frame is then transmitted through a Fibre Channel link which is under test to see if the Fibre Channel compliant link meets standards established by the user.

Other and further advantages and features of the invention will be apparent to those skilled in the art from a consideration of the following description taken in conjunction with the accompanying drawings, wherein certain methods and apparatuses of an installation for practicing the invention are illustrated. However, it is to be understood that the invention is not limited to the details disclosed but includes all such variations and modifications as fall within the spirit of the invention and scope of the appended claims.

BRIEF DESCRIPTION OF THE DRAWINGS

The accompanying drawings, which are incorporated into and form a part of the specification, illustrate several embodiments of the present invention and together with the description, serve to explain the principles of the invention.

FIG. 1 illustrates a flow chart for allowing a user to enter an unencoded pattern, formatting the unencoded pattern into a Fibre Channel compliant frame, and allowing a user to modify the Fibre Channel compliant frame.

FIG. 2 illustrates a sample unencoded user test pattern using symbolic ones and zeroes.

FIG. 3 shows a hypothetical encoded user test pattern, e.g., 10 bit format converted from 8 bit format.

DETAILED DESCRIPTION OF THE INVENTION

Figure 6:
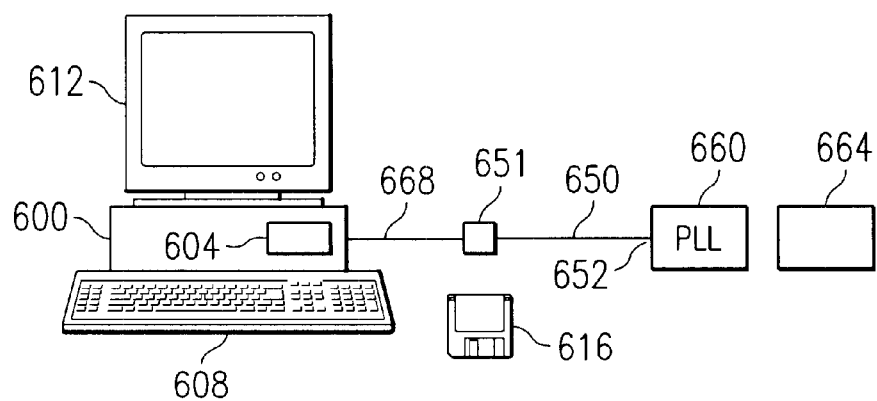
FIG. 6 illustrates a hardware configuration for the testing of a Fibre Channel link.

Referring now to the drawings, and more particularly to FIG. 1, there is shown a system generally designated 100 which comprises a method for performing a preferred embodiment of the present invention. The method includes the actions of entering a pattern that is to be formatted into a Fibre Channel compliant frame 104, converting the unencoded pattern into a code which satisfies the format for the Fibre Channel compliant frame, combining additional bookkeeping information that permits the Fibre Channel compliant frame to be recognized and processed properly, and allowing the user to visualize and modify the Fibre Channel compliant frame. As shown in FIG. 6, this method is applied to establish a Fibre Channel compliant frame which is then utilized with a Fibre Channel link in order to test whether the Fibre Channel link 650 complies with standards that the user is trying to meet.

FIG. 1 demonstrates one embodiment of the present invention. A user is first allowed to enter an unencoded pattern. The pattern is then stored in a memory 604 associated with a computer 600. Furthermore, the unencoded test pattern 200 entered by a user is encoded by utilizing the computer to encode the unencoded user test pattern so as to generate an encoded test pattern 300. Typical examples of an unencoded user test pattern 200 and an encoded user test pattern 300 can be seen in FIGS. 2 and 3, respectively. To accomplish the acts of entering an unencoded test pattern and storing that test pattern, means for allowing a user to enter a user test pattern 104 and means for storing the unencoded user test pattern in the memory associated with the computer 108 are utilized. These means are accomplished by simple computer software routines each of which would be readily understood by those of ordinary skill in the art. Furthermore, a means for encoding the unencoded user test pattern so as to generate an encoded user test pattern is utilized to accomplish the act of encoding a user test pattern. For example, a means for performing an 8 bit to 10 bit conversion on the unencoded user test pattern so as to generate a 10 bit formatted test pattern string 112 could be utilized.

As the unencoded user test pattern is converted, current and next disparity is determined using a software routine such as means for determining current and next disparity 116 as shown in FIG. 1. The current disparity at the end of the coding process is also utilized to determine end of frame data 424 shown in FIG. 4. Similarly, a means for determining error correction code data such as a means for performing a cyclic redundancy check (CRC) 120 is utilized to determine CRC data for the encoded pattern.

In a Fibre Channel compliant frame, an established amount of header information will typically be required by the Fibre Channel standard. Therefore, a means for providing header information 124, such as frame type descriptors and addressing information is utilized to properly format a test pattern into a Fibre Channel compliant frame. In addition to the header information, start-of-frame data, end of frame data, and error correction code data will typically be necessary as well. Furthermore, means for providing idle primitive data can be utilized to provide idle primitive data which act as spacing primitives between frames. The idle primitive data is part of the data string—yet, it is not a part of the Fibre Channel frame.

The computer program is programmed with any preexisting information of which the frame will be comprised. A means for combining the header information with the encoded user test pattern so as to form a data test string 128 is utilized to help establish the Fibre Channel compliant frame. For example, a means for concatenating is utilized to concatenate the start of frame data 412 with header information 404, which is concatenated with the encoded pattern 416 and error correction code data, such as CRC data 420 and end of frame data 424, so as to establish a data test string 400 which can be considered a Fibre Channel compliant frame. For example, one typical standard for a Fibre Channel compliant frame utilizes the following specifications:

| SOF3n Primitives | 40 Bits Long |
|---|---|
| Pattern | 240–20480 Bits Long |
| CRC for Pattern | 40 Bits Long |
| EOFn | 40 Bits Long |

Figure 4:
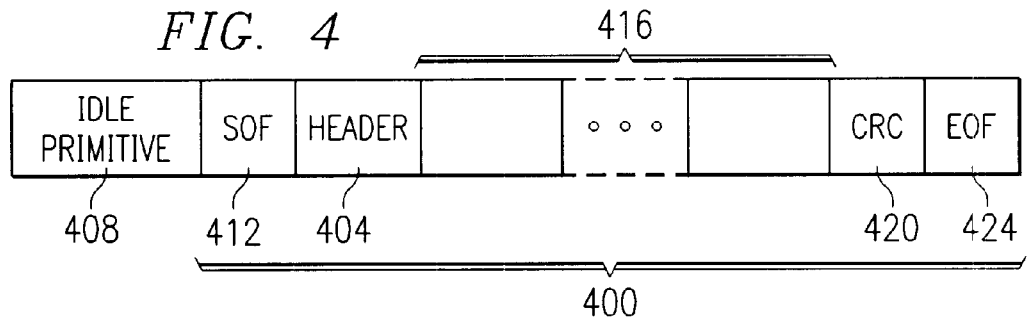
FIG. 4 illustrates a hypothetical Fibre Channel compliant frame in which the frame comprises header information, encoded pattern, error correction code data, as well as end of frame data.

A typical representative example of a Fibre Channel compliant frame can be seen in FIG. 4.

Once the Fibre Channel compliant frame is generated, it is displayed for the user so that the user can determine whether the frame appears useful in testing the Fibre Channel link. A means for displaying the resulting Fibre Channel compliant frame 131, such as a monitor, can be utilized for this purpose.

Once the user has the opportunity to visualize the generated Fibre Channel compliant frame, a means for allowing the user to change the data test string, such as a means 136 for modifying the Fibre Channel compliant frame so as to produce a revised Fibre Channel compliant frame 136, is utilized. It is envisioned that this would involve a simple software routine that prompts the user whether the user wants to output the frame to the Fibre Channel link-under test 650 or revise the Fibre Channel frame. If the user opts to modify the Fibre Channel compliant frame, one embodiment of the invention allows the user to modify the original unencoded test pattern 200 so as to generate a different unencoded user test pattern. Such a means for allowing the user to change the unencoded test pattern 144 can be seen in FIG. 1. However, once the user is satisfied with the resulting Fibre Channel compliant frame, the Fibre Channel compliant frame is converted to an output file utilizing a means for outputting the data test string to a Fibre Channel link to be tested 140.

FIG. 6 shows a configuration for one embodiment of the invention. In FIG. 6, a Fibre Channel link 650 is provided for testing. The Fibre Channel link is coupled to the computer 600 through a means for transmitting 668. The means for transmitting 668 can take the form of any typical coupling device that allows a Fibre Channel link to be connected to the computer 600. A first end 651 of the Fibre Channel link is coupled to the means for translating while the opposite end 652 of the Fibre Channel link is coupled with a phase locked loop (PLL) 660, which is typically used in Fibre Channel communications. Furthermore, a means for receiving 664 disposed at the opposite end 652 of the Fibre Channel link is utilized to receive the data stream that is emitted from the opposite end of the Fibre Channel link.

Figure 5A:
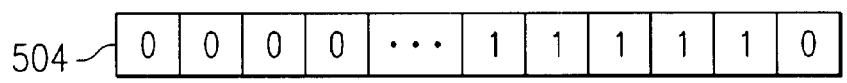
FIG. 5 illustrates a Fibre Channel compliant frame that is transmitted through a Fibre Channel link under test and a possible resulting data stream at the opposite end of the Fibre Channel link.
Figure 5B:
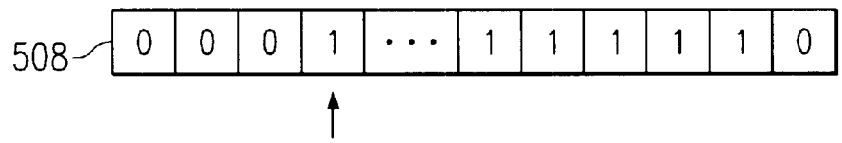

A typical Fibre Channel compliant frame 504 and a resulting data stream emitted from the Fibre Channel link 508 is shown in FIG. 5. This example represents that, due to degradation of the signal through the Fibre Channel link under test, the resulting data stream will vary in certain bit locations. For example, in FIG. 5 a bit that was transmitted as a "0" was received as a "1." When the data stream is received at the opposite end of the Fibre Channel link, it can be stored for later comparison with the Fibre Channel compliant frame that was initially sent. Through this comparison, a determination can be made as to whether the Fibre Channel link under test is in compliance with standards established by the user or customer. For example, one can determine a bit-error-rate based on the difference between the data stream 508 and the Fibre Channel compliant frame 504.

The means for receiving a data stream 664 could encompass a simple buffer which is capable of receiving and storing the data stream as it is emitted from the Fibre Channel link-under test 650. Similarly; it could encompass any device that is coupled to the opposite end of the Fibre Channel link and couples the received information to a storage unit. FIG. 6 also shows a data entry device, such as a key pad or keyboard 608 for the entry of the unencoded user test pattern. In addition, a memory 604 of the computer 600 is shown. Furthermore, a monitor 612 can be utilized to display to the user the Fibre Channel compliant frame so that the user can determine whether to modify the Fibre Channel compliant frame.

A computer usable medium 616 is shown in FIG. 6. This computer usable medium is utilized to store as a software program the method demonstrated in FIG. 1. Each of the actions shown in FIG. 1 can be achieved through simple software routines which cause a computer to perform each given act. Therefore, many of the various actions described above can be accomplished through software code routines which act as means for causing a computer to perform the described activity. Consequently, the computer useful medium can store these software routines as computer readable program code means on its physical storage medium.

The apparatuses and methods of the embodiment of the present invention and many of their attendant advantages will be understood from the foregoing description and it will be apparent that various changes may be made in the form, construction and arrangement of the parts thereof without departing from the spirit and scope of the invention or sacrificing its material advantages. The form of the invention described above is merely a preferred or exemplary embodiment thereof.

What is claimed is:

1. A method of generating a test pattern for use in testing a Fibre Channel link, the method comprising:
    allowing a user to enter via a computer an unencoded user test pattern;
    storing the unencoded user test pattern in a memory associated with the computer;
    utilizing the computer to encode the unencoded user test pattern so as to generate an encoded user test pattern;
    providing header information for the encoded user test pattern;
    combining the header information with the encoded user test pattern so as to form a data test string; and
    providing the data test string for output to a Fibre Channel link to be tested.

2. The method as described in claim 1 and further comprising displaying the data test string to the user so that the user may view the data test string.

3. The method as described in claim 2 and further comprising allowing the user to change the data test string.

4. The method as described in claim 3 and further comprising allowing the user to change the data test string so as to create a worst case test string for the Fibre Channel link.

5. The method as described in claim 3 wherein allowing the user to change the data test string comprises allowing the user to change the unencoded user test pattern.

6. The method as described in claim 5 wherein allowing the user to change the data test string so as to create a worst case test string for the Fibre Channel link comprises creating a logical transition pattern to test a phase locked loop located at a receiving end of the Fibre Channel.

7. The method as described in claim 1 wherein utilizing the computer to encode the unencoded user test pattern so as to generate the encoded user test pattern comprises:
    performing an 8 bit to 10 bit conversion on the unencoded user test pattern to generate a 10 bit-format test pattern string; and
    storing the 10 bit-format test pattern string.

8. The method as described in claim 7 and further comprising:
    determining Current Disparity so as to select end of frame data.

9. The method as described in claim 7 and further comprising:
    determining error correction code data.

10. The method as described in claim 1 and further comprising:
    determining Current Disparity so as to select end of frame data.

11. The method as described in claim 1 and further comprising:
    determining error correction code data.

12. The method as described in claim 11 and further comprising:
    providing start of frame data; and
    providing end-of-frame data.

13. The method as described in claim 12 and further comprising:
    forming a Fibre Channel compliant frame by concatenating the start of frame data, the encoded user test pattern string, the error correction code data, and the end of frame data.

14. A method of generating a test pattern for use in testing a Fibre Channel link, the method comprising:
    allowing a user to enter via a computer an unencoded user test pattern;
    storing the unencoded user test pattern in a memory associated with the computer;
    utilizing the computer to encode the unencoded user test pattern so as to generate an encoded user test pattern;
    determining start of frame data;
    determining error correction code data;
    determining end-of-frame data;
    forming a Fibre Channel compliant frame by concatenating the start of frame data, the encoded user test pattern, the error correction code data, and the end of frame data;
    displaying the Fibre Channel compliant frame for the user.

15. The method as described in claim 14 and further comprising:
    allowing the user to revise the Fibre Channel compliant frame.

16. The method as described in claim 15 and further comprising outputting the Fibre Channel compliant frame.

17. The method as described in claim 15 and further comprising:
    providing a Fibre Channel link for testing;
    transmitting the Fibre Channel compliant frame from a first end of the Fibre Channel link;
    receiving a data stream at an opposite end of the Fibre Channel link.

18. The method as described in claim 17 and further comprising:
    storing the data stream received at the opposite end of the Fibre Channel link;
    comparing the data stream to the Fibre Channel compliant frame.

19. The method as described in claim 18 and further comprising:
    determining whether the Fibre Channel link is acceptable based on the act of comparing the data stream to the Fibre Channel compliant frame.

20. The method as described in claim 18 and further comprising:
    determining a bit-error-rate based on differences between the data stream and the Fibre Channel compliant frame; and
    determining whether the Fibre Channel link is acceptable based on the bit-error-rate.

21. A computer system for generating a Fibre Channel compliant frame which can be used for testing a Fibre Channel link in need of testing, the system comprising:

a computer;

a data entry device associated with the computer to allow a user to enter an unencoded user test pattern;

a memory associated with the computer on which the unencoded user test pattern can be stored;

means for storing the unencoded user test pattern in the memory associated with the computer;

means for encoding the unencoded user test pattern so as to generate an encoded user test pattern;

means for providing header information; and means for combining the header information with the encoded user test pattern so as to form a data test string.

22. The computer system as described in claim 21 and further comprising means for outputting the data test string to a Fibre Channel link to be tested.

23. The computer system as described in claim 21 and further comprising a monitor so that the data test string can be displayed for the user.

24. The computer system as described in claim 23 and further comprising means for allowing the user to change the data test string.

25. The computer system as described in claim 24 wherein the means for allowing the user to change the data test string comprises means for allowing the user to change the unencoded test pattern.

26. The computer system as described in claim 21 wherein the means for encoding the unencoded user test pattern so as to generate the encoded user test pattern comprises:

means for performing an 8 bit to 10 bit conversion on the unencoded user test pattern so as to generate a 10 bit-format test pattern string; and storage unit for the 10 bit-format test pattern.

27. The computer system as described in claim 26 and further comprising:

means for determining Current and Next Running Disparity so as to select end of frame data.

28. The computer system as described in claim 26 and further comprising:

means for determining error correction code data.

29. The computer system as described in claim 21 and further comprising:

means for determining Current and Next Running Disparity so as to select end of frame data.

30. The computer system as described in claim 21 and further comprising:

means for determining error correction code data.

31. The computer system as described in claim 21 and further comprising:

means for providing start of frame data; and means for providing end-of-frame data.

32. The computer system as described in claim 31 and further comprising means for concatenating the start of frame data, the encoded user test pattern, the error correction code data, and the end of frame data.

33. An article of manufacture, comprising:

a computer usable medium having a computer readable program code means embodied therein for generating a Fibre Channel compliant frame, the computer readable program code means in said article of manufacture comprising:

computer readable program means for causing a computer to allow a user to enter an unencoded user test pattern;

computer readable program means for causing the computer to store the unencoded user test pattern in a memory associated with the computer;

computer readable program means for causing the computer to encode the unencoded user test pattern so as to generate an encoded user test pattern;

computer readable program means for causing the computer to provide header information; and computer readable program means for causing the computer to combine the header information with the encoded user test pattern so as to form a data test string.

34. A computer program product for use in testing a Fibre Channel link, said computer program product comprising:

a computer usable medium having computer readable program code means embodied in said medium for causing generation of a Fibre Channel compliant frame, said computer program product having:

computer readable program code means for causing said computer to allow a user to enter an unencoded user test pattern;

computer readable program code means for causing said computer to store the unencoded user test pattern in a memory associated with a computer;

computer readable program code means for causing said computer to encode the unencoded user test pattern so as to generate an encoded user test pattern;

computer readable program code means for causing said computer to provide header information; and computer readable program code means for causing said computer to combine the header information with the encoded user test pattern so as to form a data test string.

35. A method of testing a Fibre Channel link, the method comprising:

allowing a user to enter an unencoded user test pattern;

storing the unencoded user test pattern;

performing an 8 bit to 10 bit conversion on the unencoded user test pattern to generate a 10 bit-format test pattern string;

storing the 10 bit-format test pattern string;

determining Current Disparity so as to select end of frame data;

determining CRC data for the 10 bit-format test pattern;

providing end of frame data;

forming a Fibre Channel compliant frame by concatenating start of frame data, the 10 bit-format test pattern string, the CRC data, and the end of frame data;

displaying the Fibre Channel compliant frame for the user;

allowing the user to modify the unencoded user test pattern so as to revise the Fibre Channel compliant frame;

outputting the Fibre Channel compliant frame;

providing a Fibre Channel link for testing;

transmitting the Fibre Channel compliant frame from a first end of the Fibre Channel link;

receiving a data stream at an opposite end of the Fibre Channel link;

storing the data stream received at the opposite end of the Fibre Channel link;

comparing the data stream to the Fibre Channel compliant frame;

determining a bit-error-rate based on the differences between the data stream and the Fibre Channel compliant frame; and determining whether the Fibre Channel link under test is acceptable based on the bit-error-rate.

36. A computer system for generating a Fibre Channel compliant frame which can be used for testing a Fibre Channel link in need of testing, the system comprising:

a data entry device to allow a user to enter an unencoded user test pattern;

a memory;

means for performing an 8 bit to 10 bit conversion on the unencoded user test pattern to generate a 10 bit-format test pattern string;

means for determining Current Disparity so as to select end of frame data;

means for determining CRC data for the 10 bit-format test pattern;

means for providing end of frame data;

means for concatenating the start of frame data, the 10 bit-format test pattern string, the CRC data, and the end of frame data so as to form a Fibre Channel compliant frame;

a monitor on which the Fibre Channel compliant frame can be displayed;

means for modifying the Fibre Channel compliant frame so as to produce a revised Fibre Channel compliant frame.

means for outputting the Fibre Channel compliant frame;

means for transmitting the Fibre Channel compliant frame from a first end of the Fibre Channel link under test;

means for receiving a data stream at the opposite end of the Fibre Channel link under test;

means for comparing the data stream received at the opposite end of the Fibre Channel link to the Fibre Channel compliant frame transmitted from the first end of the Fibre Channel link;

means for determining a bit-error-rate based on the differences between the data stream and the Fibre Channel compliant frame; and means for determining whether the Fibre Channel link under test is acceptable based on the bit-error rate.

* * * * *